United States Patent [19]
Corsette

[11] 4,433,799
[45] Feb. 28, 1984

[54] LIQUID DISPENSING PUMP ARRANGEMENT WITH SELECTIVE STROKE RESTRICTION

[75] Inventor: Douglas F. Corsette, Los Angeles, Calif.

[73] Assignee: Calmar, Inc., Watchung, N.J.

[21] Appl. No.: 363,835

[22] Filed: Mar. 31, 1982

[51] Int. Cl.³ .............................................. B65D 47/34
[52] U.S. Cl. ..................................... 222/309; 222/320
[58] Field of Search .............. 222/320, 321, 340, 341, 222/384, 385, 402.11, 402.17, 309

[56] References Cited
U.S. PATENT DOCUMENTS 3,484,023 12/1969 Meshberg ..................... 222/402.11
4,369,899 1/1983 Magers et al. ................. 222/321 UX Primary Examiner—Stanley H. Tollberg
Attorney, Agent, or Firm—Lee C. Robinson, Jr.

[57] ABSTRACT

A liquid-dispensing pump arrangement permits positive setting into various full-stroke, stroke limited, and off positions by rotation of the dispensing head thereof. The arrangement includes a reciprocating pump having a dip tube, a pump body, and a depressible stem and which is supported in a screw cap or other closure. A pedestal on the screw cap has longitudinal detents on a circumferential surface thereof, and also has a helical ramp thereon extending at least part way around the stem. A finger-depressible push-button dispensing head atop the stem has a radial outlet nozzle and a depending skirt which overlaps the circumferential surface of the pedestal. Fins or vanes on the skirt are spaced apart and engage the detents on the pedestal. The vanes are resiliently flexible and normally engage the cutout detents to establish each rotational position, but can be deflected by manually turning the dispenser head so that the latter can be easily rotated to another desired position. In a locked or off position, an upper surface of the ramp prevents any downward travel of the dispenser head.

15 Claims, 11 Drawing Figures

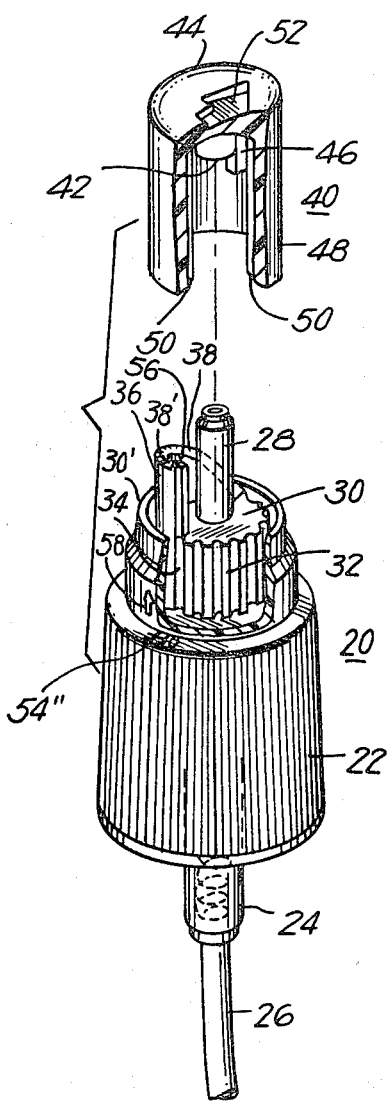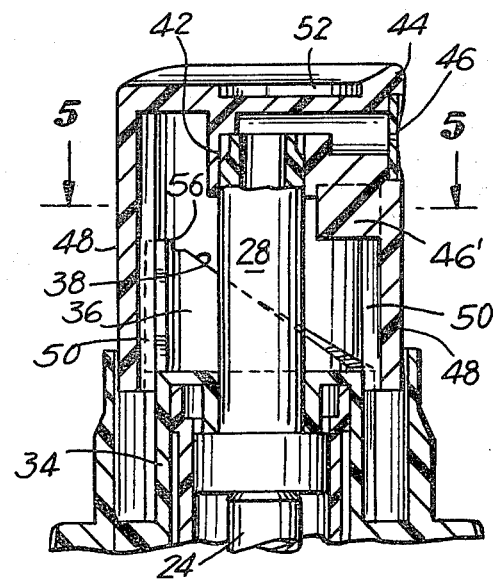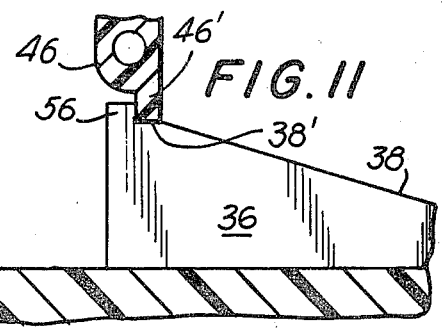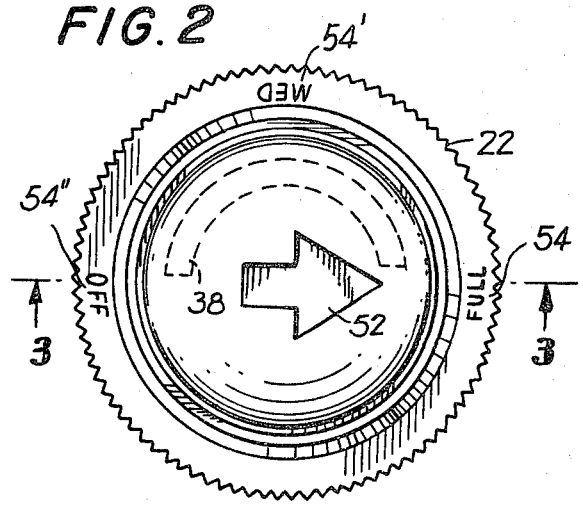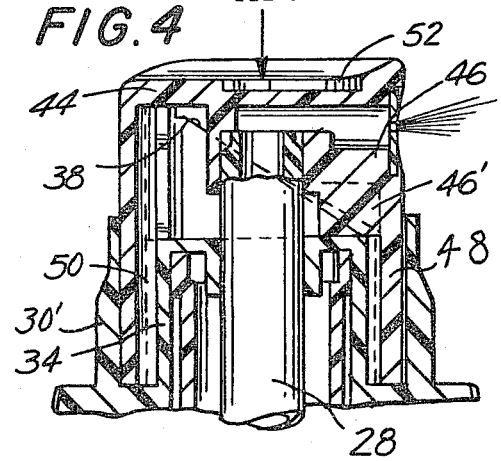

LIQUID DISPENSING PUMP ARRANGEMENT WITH SELECTIVE STROKE RESTRICTION

BACKGROUND OF THE INVENTION

1. Field of the Invention

This invention relates to liquid dispensing pumps of the type in which a finger-actuated plunger powers a reciprocal piston pump. More particularly, this invention is directed to an arrangement including such a pump in which a push-button, finger-depressible dispensing head is rotatable to various predetermined rotational positions, and in which means are provided for varying the stroke distance of the dispensing head according to the selected rotational position thereof.

2. Brief Description of the Prior Art

Many finger-powered dispensing pumps have been previously proposed, including pressure-accumulating dispensing pumps such as that disclosed in my U.S. Pat. No. 3,414,169.

These pumps can be arranged as sprayers or atomizers in which a spray nozzle emits the pumped liquid as a spray, as shown in U.S. Pat. No. 3,194,447. Alternatively, the pumps can be arranged as liquid dispensers in which a dispensing nozzle thereof is a discharge spout, as shown in my U.S. Pat. No. 3,216,625.

It has been desired that means be provided for metering the amount of liquid dispensed, and also that such means be easy for a consumer to operate. For example, if the pump is used on a spray dispensing bottle for a hair spray, a consumer may desire full measure of hair spray with each actuation only when he or she is styling his or her hair. If only a touch-up is required, the consumer would desire that each actuation provide only a partial measure of the hair spray. Also, if the container with the pump thereon is to be stored or shipped, the consumer should be able to set the pump into a "lock" position wherein the dispensing arrangement is positively prevented from dispensing the contents of the container.

Previous attempts to provide limiting means have included plugs and/or cones disposed within the pump body to limit stroke length. However, the structure of these prior attempts has not been particularly sturdy, and the structural parts are easily broken by vigorous finger action on the sprayer head. Further, because the structure is disposed within the pump body, it is difficult to align the various measured-stroke positions thereof merely by changing the rotational position of the sprayer or other dispensing head. As a result, particular spray settings could not be accurately established. This drawback is further complicated in those devices in which the dispensing head can be removed from the hollow stem of the pump body and replaced in a different rotational orientation.

Consequently, it has been desired to construct a liquid dispensing pump arrangement whose structure avoids the drawbacks of the conventional devices, which has sturdy and reliable structure, and which permits positive setting into various full stroke, stroke-limited, and off positions, for example, by simple rotation of the dispensing head.

OBJECTS AND SUMMARY OF THE INVENTION

Accordingly, it is an object of this invention to provide a liquid dispensing arrangement in which there are included simple, yet accurate stroke determining means.

It is another object of this invention to provide such a liquid dispensing arrangement in which the stroke of a depressible stem on a reciprocal pump body is limited by means external to said pump body.

It is yet another object of this invention to provide such a liquid dispensing arrangement in which a helical ramp provides a cam surface for limiting the downward stroke motion of a dispensing cap on said stem, the stroke motion being varied by rotating the cap between predetermined stable rotational positions thereof.

It is still another object of this invention to provide a liquid dispensing pump arrangement whose structure is sturdy and will withstand manual operation of the pump.

It is a further object of this invention to provide a liquid dispensing pump arrangement in which pump stroke distances are positively established by rotating the dispensing head thereof between predetermined rotational positions, and including structure for establishing such positions, but which will yield to manual rotational force applied to the head so that the latter can be rotated to another such rotation position.

According to one aspect of this invention, a liquid dispensing pump arrangement is configured for dispensing predetermined quantities of a dispensible liquid contained in a bottle, jar, or other vessel with which the pump arrangement is associated. A reciprocating pump is provided, having a dip tube extending into the liquid, a pump body, and a depressible hollow pump stem through which the pumped liquid is delivered. A screw cap or other closure supports the reciprocating pump on the vessel with the dip tube immersed into the liquid in the vessel. A pedestal on the screw cap extends around the base portion of the stem and has a generally cylindrical outer surface. A finger-depressible push-button dispensing head, which can be, for example, a spray head or a spout dispenser, has a socket overfitting the top of the stem and an outlet nozzle extending radially therefrom. A depending skirt extends downward from the top of the head and over the cylindrical surface of the pedestal. A helical ramp is affixed to the top of the pedestal and extends circumferentially at least part way around the stem. A sloping cam surface on the top of this ramp engages the dispensing head when the latter is depressed to limit its downward stroke. As the head is turned, the permissible stroke distance thereof varies. Cooperating detent structure is provided on the circumferential surface of the pedestal and on a facing surface of the depending skirt. In one preferred embodiment, this structure takes the form of fins or vanes on the skirt and corresponding axial grooves or cutout detents on the pedestal. These can be spaced evenly around the skirt and the pedestal. The vanes normally engage the cutout detents to establish each rotational position, but are resiliently flexible and can be deflected by manually turning the dispenser head so that the latter can be readily rotated to another desired position.

In several possible embodiments, the head is a spray head, and the nozzle thereof has a surface disposed a distance below a discoid member, the latter being adapted for receiving the user's finger. In such case it can be this surface of the nozzle that engages the ramp to limit the pump stroke.

In various embodiments, a flat "lock" portion is provided at the top of the ramp, that is, at the portion thereof most remote from the pedestal. If the head is rotated so that a portion thereof engages this flat surface, i.e., to a lock or off position, the dispensing head cannot be depressed and can be safely stored or shipped.

Stopping means, such as a cutout at the top of the ramp and an engaging tab on the nozzle, can be included to prevent the head from being turned beyond such lock or off position.

The above and other objects, features, and advantages of this invention will become apparent from the ensuing detailed description of one preferred possible embodiment, which description is to be considered in connection with the accompanying drawings.

BRIEF DESCRIPTION OF THE DRAWINGS

FIG. 1 is a partially cut-away, partly exploded perspective view of a spray pump arrangement according to one embodiment of this invention.

FIG. 2 is a plan view of the embodiment of FIG. 1.

FIGS. 3 and 4 are sectional views along the line 3—3 of FIG. 2.

FIG. 11 is a flattened projection of certain features shown in FIGS. 9 and 10.

DETAILED DESCRIPTION OF A PREFERRED EMBODIMENT

Figure 5:
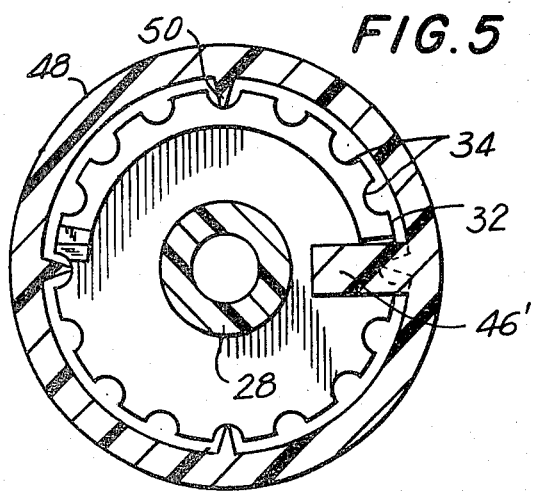
FIG. 5 is a cross-sectional view along the line 5—5 of FIG. 3.

With reference to the accompanying drawings, and initially to FIG. 1 thereof, a preferred embodiment of a liquid dispensing pump arrangement 10 of this invention is shown to be formed of a closure cap 20 having a knurled peripheral wall 22 and an inner wall (not shown) which is threaded or flanged to engage the neck of a bottle, canister, or other container (not shown).

Supported within the closure cap 20 is a dispensing pump formed of a pump body 24, with a dip tube or syphon 26 extending from the pump body down into a liquid within the container. A hollow, depressible pump stem 28 delivers the pumped liquid from the pump body 24. Rising from the closure cap 20 is a pedestal 30 which surrounds at least a base portion of the stem 28. The pedestal 30 is generally cylindrical in shape and a generally cylindrical circumferential face 32 thereof has a plurality of circumferentially spaced longitudinal, or axial cutout detents 34 therein, whose function will be described in detail below.

A helical ramp 36 is fixedly disposed atop the pedestal 30, and extends circumferentially at least partly around the stem 28. The ramp 36 has a sloping cam surface 38 which rises from the pedestal 30 to a flat locking portion 38' at the top of the ramp 36.

A cylindrical flange or collar 30' is disposed on the closure cap 20 coaxially with the pedestal 30 and spaced somewhat therefrom. This flange 30' can be used to engage a protective overcap (not shown).

A finger-depressible push-button spray head 40 is designed to fit atop the stem 28 so that the latter can be pushed down to operate the pump 24. A socket 42 in the spray head 40 engages the top of the stem 28, and is generally centrally supported on a finger-engaging disk-like member 44. A nozzle 46 extends radially from the socket 42 on the underside of the disk-like member 44, as shown in FIG. 3. In this embodiment, the nozzle 46 is an atomizing nozzle for dispensing the pumped liquid as a fine mist. However, this invention could as easily be applied to various other dispensers, and the nozzle 46 could, for example, be a spigot or the like.

A tab 46' depending from the nozzle 46 engages the cam surface 38, at least at certain rotational positions of the spray head 40 relative to the closure cap 20, and thereby cooperates with the cam surface 38 to limit the stroke of the pump stem 28 at such positions.

A cylindrical depending skirt 48 extends downward from the disk-like member 44 to at least a position between pedestal 30 and the flange 30'.

As perhaps better shown in FIGS. 3 and 5, a set of four vanes 50, which could also be flaps or fins, are disposed on the interior surface of the depending skirt 48. These vanes 50 are evenly faced thereon at intervals of 90°. Each such vane 50 extends generally vertically along the interior of the skirt 48, and also extends radially inward an amount sufficient to extend into the cutout detents 34. These vanes 50 are resiliently flexible so that they can be deflected out of engagement with the cooperating cutout detents 34 if the spray head 40 is rotated by hand relative to the closure 20.

As shown, for example in FIGS. 1 and 2, an indicator arrow 52 is embossed onto the top side of the disk-like member 44 and the direction thereof is aligned with the outlet of the nozzle 46 to indicate the direction of spraying therefrom. A set of indicia 54, 54', and 54" are embossed on the closure 20 in positions to be clearly visible to the user. The indicia 54, 54', and 54" are marked to indicate a full pump-stroke position, an intermediate, or limited pump-stroke position, and an off position, respectively.

When the spray head 40 is in its rotational position as shown in FIGS. 2, 3, and 4 in which the indicator arrow 50 is aligned with the full pump-stroke indicium 54, the spray nozzle 46 is rotationally positioned with respect to the ramp 36 such that the cam surface 38 of the latter will not obstruct the tab 46'. Consequently, the spray head 40 can be depressed a full amount, as shown in FIG. 4. As a result, when the indicator arrow 52 is aligned with the full pump-stroke indicium 54, the entire contents of the pump body 24 can be pumped out of the nozzle 46 with each pump stroke, i.e., with each finger depression of the head 40.

As shown in FIG. 5, in the above-mentioned position, the vanes 50 are aligned with a particular four of the axial cutouts 34, so that the skirt 48 moves freely in the vertical or axial direction between the pedestal 30 and the outer flange 30'.

If the user desires that each pump stroke deliver a lesser amount of the liquid, the user can grip the spray head 40 with his fingers and gently rotate it, relative to the closure 20, to an intermediate position in which the indicator arrow 52 is aligned with the limited-stroke indicium 54'.

Figure 6:
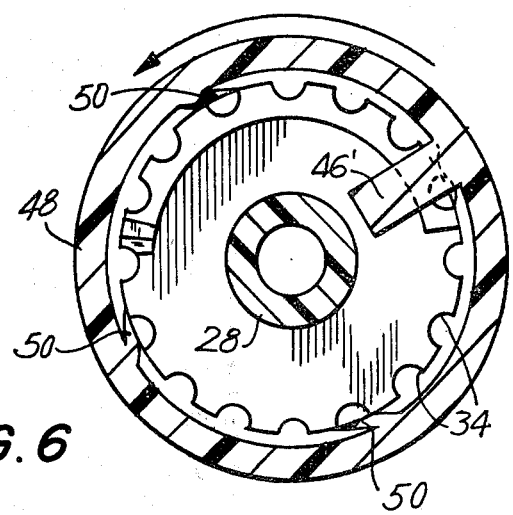
FIG. 6 is a cross-sectional view showing relative rotation of the elements shown in FIG. 5.
Figure 7:
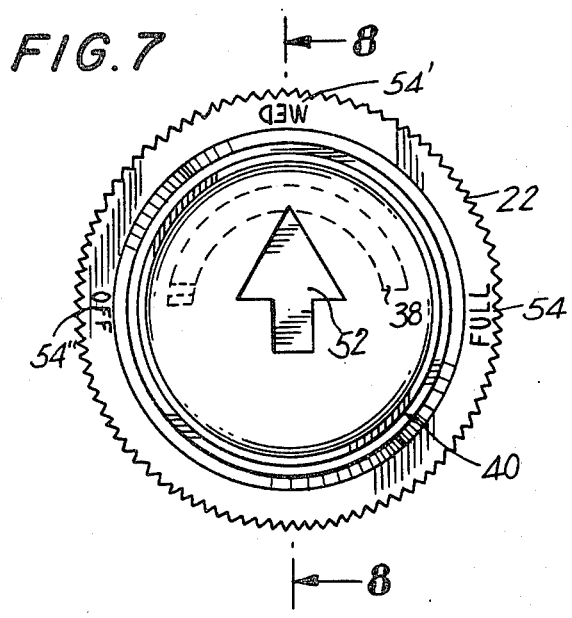
FIG. 7 is a plan view of the embodiment of FIG. 1 when rotated to another setting.

As shown in FIG. 6, when the spray head 40 is twisted (here, counter-clockwise), the vanes 50 are deflected out of engagement with the cutout detents 34. The user then continues to rotate the head 40 until the vanes 50 again align with four of the cooperating cutout detents 34. In this illustration, the spray head is rotated an angle of 90° and arrives at the stable position as shown in FIG. 7. At this position, the vanes 50 cooperate with the cutout detents 34 to define the stable rotational position shown, and to resist further rotation.

When the vanes 50 and the cutout detents 34 are aligned, for example as shown in FIG. 5, the skirt 48 can move freely up and down (that is, axially). Consequently, the spray head does not itself resist the user's finger pressure. However, if the vanes 50 are disposed between successive cutout positions, as shown in FIG. 6, the vanes 50 frictionally engage the circumferential pedestal face 32, and there is considerable frictional resistance to axial motion of the head 40. This informs the user that the head is between positions, and thus avoids the spray head being depressed at an undesired position between the established rotational positions corresponding, for example, to the indicia 54, 54', and 54".

Figure 8:
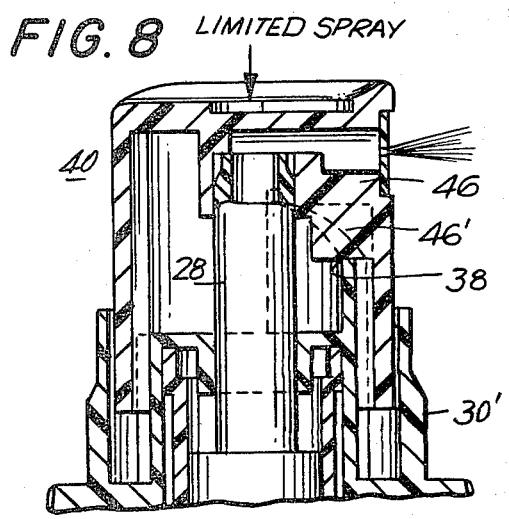
FIG. 8 is a sectional view along the line 8—8 of FIG. 7.

As shown in FIG. 8, when the head 40 is rotated so that the indicator arrow 52 is aligned with the intermediate indicium 54', a limited-stroke position is attained. In this position, the nozzle tab 46' is disposed at a rotational position over a midway portion of the cam surface 38 of the ramp 36. Here, depression of the spray head 40 is stroke-limited by the ramp 36. That is, the head 40 can be depressed only until the tab 46' engages the cam surface 38. The head 40 is blocked from further downward travel. Consequently, in this position, each depression of the spray head 40 delivers only a predetermined fraction of the contents of the spray body 24.

Figure 9:
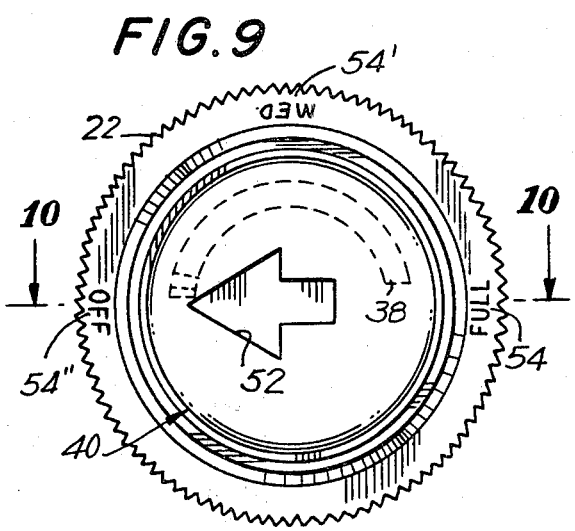
FIG. 9 is a plan view of the embodiment of FIG. 1 when rotated to still another setting.
Figure 10:
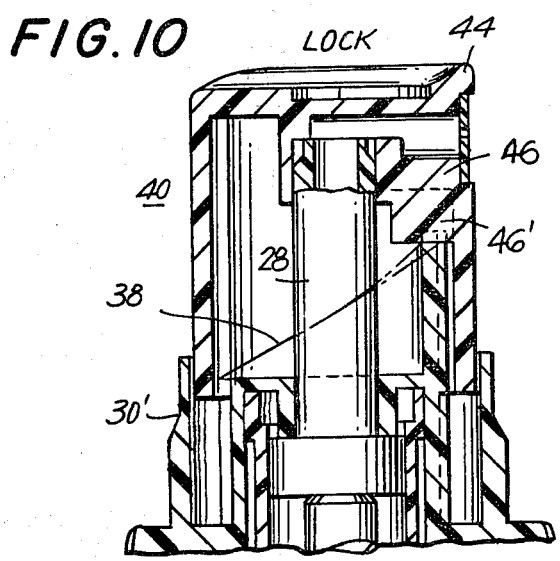
FIG. 10 is a sectional view along the line 10—10 of FIG. 9.

In this embodiment, the head 40 can also be rotated to an off position as shown in FIGS. 9 and 10, in which the indicator arrow 52 is aligned with the indicium 54" to indicate an off, or lock position. In this position, the tab 46' engages the flat portion 38' of the ramp 36, and is held in position by the engagement of the vanes 50 with the cutout detents 34. Thus, here the spray head 40 is blocked from any downward travel, so that the pump 24 cannot be actuated.

This off or locked position can be used as a shipping position, to obviate the need for a separate protective overcap. This position can also be used during travel, for example, to protect the user's clothing if a bottle with such a spray head is packed together with clothes in the user's luggage.

As shown in FIG. 11, a boss 56 can be included on the cam surface 38 near the flat portion 38' of the ramp 36. This boss 56 engages the tab 46' when the head 40 is turned to the off position, and prevents the head 40 from being overdriven or rotated beyond the end of the ramp 36 into a full stroke position.

Favorably, this boss 56 supports the lower surface of the nozzle 46 when the head 40 is in the lock position. This prevents excessive top loads from unduly deforming the tab 46' and ramp 38. To ensure proper operation of the locking structure, the tab 46' is favorably placed on the downslope side of the nozzle 46.

From the foregoing, it is apparent that the liquid dispensing pump arrangement of this invention has many novels features providing an advantage over conventional such devices.

For example, in this invention, a sloping ramp is used, rather than a step arrangement. This permits turning of the head to a medium or off position even if the pump stem 28 has, for some reason, not returned to its normal, raised position. Consequently, the sloping ramp 36 acts as an inclined plane to raise the head 40. Contrary to stepped arrangements, the cam surface 38 of the ramp 36 avoids the structure of perpendicular surfaces, which could act to block such rotation.

It should be noted that the flat portion 38' could be slightly concave to cradle the tab 46', and thus engage it somewhat more securely when the head 40 is in the locked position.

Further, although the above-described embodiment has been described by illustrating a full pump-stroke position, an off position, and a single intermediate position, it should be apparent that the pump arrangement of this invention could have any number of intermediate positions. Such positions could be arranged in dependence on the number and positions of the vanes 50 and corresponding cutout detents 34. Also, the degree of stroke limitation can be altered by changing the configuration of the ramp 36.

In the above-described embodiment, the ramp 36 is preferably formed unitarily with the pedestal 30, for example, by injection molding. However, the ramp 36 and pedestal 30 could alternatively be formed separately and assembled by glueing, by means of a locking mechanical fitting, or by ultrasonic welding.

Also, while the above-described embodiment has vanes 50 on the depending skirt 48 and cutout detents 34 on the pedestal 30, in other possible embodiments, this configuration could be reversed: the vanes 50 could be provided on the pedestal 30 with cooperating cutouts on the skirt 48.

As an alternative to the indicia 54, 54', and 54", one or more index 58 (FIG. 1) can be embossed onto the collar 30'. This configuration permits simple rotation of the portion of the injection molding apparatus used for molding the collar 30' to adjust the position of the index 58 whenever a closure cap for a particular use is desired.

For example, the same pump arrangement could be used for a hair spray container (where a partial stroke might be ⅔ of a full stroke) and also for a cologne container (where a partial stroke might be ½ of a full stroke). The closures for these two uses can be manufactured in a single run, interrupted briefly merely to rotate the collar-forming part of the injection molding apparatus.

Terms of orientation, such as "upper", "lower", and "vertical", are used herein for purposes of clarity to identify the orientation relative to the drawings. Such terms are not intended to limit the scope of this invention or to exclude any equivalent structure.

While the present invention has been described with reference to a single preferred embodiment thereof, it is apparent that many possible modifications and variations could be easily effected by one skilled in the art without departing from the scope and spirit of this invention, which are to be defined by the appended claims.

I claim:

1. A liquid dispensing pump arrangement for dispensing predetermined quantities of a dispensible liquid contained in a vessel, comprising
reciprocating pump means having a dip tube extending into said liquid in said vessel and a depressible pump stem through which the liquid is delivered;
a vessel closure fastenable onto a cooperating port of the vessel and supporting the reciprocating pump means with said dip tube immersed into said liquid and including a pedestal surrounding a portion of said stem and having a generally cylindrical outer surface with a plurality of circumferentially spaced axial cutouts thereon;

a finger-depressible push-button dispensing head disposed atop said stem and including socket means surrounding a top portion of said stem, an outlet nozzle extending from said socket means, and depending skirt means extending over at least a portion of the cylindrical surface of said pedestal;

a helical ramp on said pedestal extending circumferentially at least part way around said stem and having a sloping cam surface engageable with said dispensing head to limit downward stroke distance thereof a plurality of different amounts at a respective plurality of rotational positions of said head relative to said vessel closure;

a plurality of circumferentially-spaced fins disposed on said depending skirt means corresponding with at least some of said cutouts and cooperating therewith to define said plurality of rotational positions of said dispensing head relative to said closure and yieldably resisting rotation between such positions.

2. A liquid dispensing pump arrangement for dispensing predetermined quantities of a dispensible liquid contained in a vessel, comprising reciprocating pump means having a dip tube extending into said liquid in said vessel and a depressible axial pump stem through which the liquid is delivered;

a vessel closure fastened onto a cooperating port of the vessel and supporting the reciprocating pump means with said dip tube immersed into said liquid and including a pedestal surrounding a portion of said stem and having a generally cylindrical outer surface with a plurality of circumferentially-spaced axial detent cutouts thereon;

a finger-depressible push-button dispensing head disposed atop said stem and including socket means surrounding a top portion of said stem, an outlet nozzle extending from said socket means, and depending skirt means extending over at least a portion of the cylindrical surface of said pedestal;

a helical ramp fixed on said pedestal extending circumferentially at least part way around said stem and having a sloping cam surface engageable with a part of said dispensing head to limit downward stroke distance thereof a plurality of different amounts at a respective plurality of rotational positions of said head relative to said vessel closure;

a plurality of circumferentially-spaced fins on said depending skirt means whose spacing corresponds with the spacing of said cutouts extending radially into engagement with said cutouts to define said rotational positions of said dispensing head relative to said vessel closure, said fins being resiliently flexible so that said fins normally engage a corresponding plurality of said cutouts to maintain an established said rotational position, but can be deflected out of engagement with said cutouts by manual rotation of said dispensing head between said positions.

3. A liquid dispensing pump arrangement for dispensing predetermined quantities of a dispensible liquid contained in a vessel, comprising reciprocating pump means having dip tube means extending into said liquid in said vessel and a depressible hollow pump stem through which the liquid is delivered;

a vessel closure fastenable onto a cooperating port of the vessel and supporting the reciprocating pump means with said dip tube means immersed into said liquid and including a pedestal surrounding a portion of said stem and having a generally cylindrical outer surface;

a finger-depressible push-button dispensing head disposed atop said stem and including socket means surrounding a top portion of said stem, an outlet nozzle extending from said socket means, and depending skirt means extending over at least a portion of the cylindrical surface of said pedestal and being axially movable relative thereto;

a helical ramp on said pedestal extending circumferentially at least part way around said stem and having a sloping cam surface engageable with a portion of said dispensing head to limit downward stroke distance thereof a plurality of different selected amounts at a respective plurality of rotational positions of said head relative to said vessel closure;

a set of circumferentially-spaced fins and a corresponding set of circumferentially-spaced detents, one of which sets is disposed on the circumferential surface of said pedestal and the other of which disposed on a facing surface of said depending skirt, said fins being resiliently flexible so that said fins normally engage a corresponding plurality of said detents to maintain an established said rotational position, but can be deflected out of engagement with said detents by manual rotation of said dispensing head between said rotational positions.

4. A liquid dispensing pump arrangement for dispensing predetermined quantities of a dispensing liquid contained in a vessel, comprising reciprocating pump means having dip tube means extending into said liquid in said vessel and a depressible pump stem through which the liquid is delivered;

a vessel closure fastenable onto a cooperating port of the vessel and supporting the reciprocating pump means with said dip tube means immersed into said liquid and including a pedestal surrounding a lower portion of said stem and having a generally cylindrical outer surface;

a finger-depressible push-button spray head disposed atop said stem and including socket means surrounding a top portion of said stem, a spray nozzle extending radially from said socket means, and depending skirt means extending over at least a portion of the cylindrical surface of said pedestal;

cooperating detent means arranged on said circumferential surface of said pedestal and on a facing surface of said depending skirt means for establishing a plurality of rotational positions of said spray head relative to said vessel closure, normally holding said spray head at one such rotational position but resiliently yielding under manual force to permit turning of said head to at least another said rotation position relative to said vessel closure; and a helical ramp on said pedestal extending at least part way around said stem and having a continuous sloping cam surface engageable with a portion of said spray head to limit downward stroke distance thereof at least one restricted amount when said head is at one predetermined rotational position, and a flat portion distant from said pedestal and corresponding to another said rotational position at which said head is prevented from being depressed.

5. A liquid dispensing pump arrangement according to claim 4, wherein, in yet another said rotational position, said ramp does not contact said portion of said spray head thereby permitting a full downward stroke for dispensing a maximum said predetermined quantity of said liquid.

6. A liquid dispensing pump arrangement for dispensing predetermined quantities of a dispensible liquid contained in a vessel, comprising reciprocating pump means having dip tube means extending into said liquid in said vessel and a depressible hollow pump stem through which the liquid is delivered;

a vessel closure fastenable onto a cooperating port of the vessel and supporting the reciprocating pump means with said dip tube means immersed into said liquid and including a pedestal surrounding a lower portion of said stem and having a generally cylindrical outer surface;

a helical ramp affixed on said pedestal extending circumferentially at least part way around said stem and having a continuous sloping cam surface thereon;

a finger-depressible push-button dispensing head disposed atop said stem and including socket means surrounding a top portion of said stem, a finger-engageable discoid member atop said socket means, an outlet nozzle extending radially from said socket means and having a surface axially below said discoid member engageable with said cam surface of said ramp at at least one rotational position of said dispensing head relative to said closure to limit downward stroke distance of said head, and depending skirt means extending axially from the periphery of said discoid member at least to said pedestal and extending circumferentially at least part way around the latter; and cooperating detent means arranged on said circumferential surface of said pedestal and on a facing surface of said depending skirt means for establishing a plurality of rotational positions of said dispensing head relative to said vessel closure, normally holding said dispensing head at an established said rotational position but resiliently yielding upon manual force to permit turning of said head to at least another said rotational position relative to said vessel closure.

7. A liquid dispensing pump arrangement according to claim 6, wherein said discoid member is generally concave on an upper surface thereof for engagement with a user's finger.

8. A liquid dispensing pump arrangement according to claim 6, said discoid member bearing a directional indicator on said upper surface to indicate the axial direction of said nozzle.

9. A liquid dispensing pump arrangement according to claim 8, further comprising a plurality of indicia on said vessel closure each corresponding to a predetermined one of said rotational positions of said head relative to said vessel closure, said directional indicator aligning with each particular indicium when the dispensing head is in a corresponding said rotational position, with each such indicium on said vessel closure identifying the downward stroke distance that the dispensing head can be depressed when at the corresponding rotational position.

10. A liquid dispensing pump arrangement for dispensing predetermined quantities of a dispensible liquid contained in a vessel, comprising reciprocating pump means having a dip tube extending into said liquid in said vessel, a pump body, and an axially depressible pump stem through which the liquid is delivered;

a vessel closure fastenable onto a cooperating port of the vessel and supporting the reciprocating pump means with said dip tube immersed into said liquid and including a pedestal surrounding a portion of said pump stem adjacent said pump body and having a generally cylindrical outer surface;

a finger-depressible push-button spray head disposed atop said stem and including socket means surrounding an end portion of said stem remote from said pump body, a spray nozzle extending radially from said socket means for discharging said liquid in a selected discharging direction, a finger-engageable discoid member atop said socket means and said nozzle with the latter having means thereon axially closer than said discoid member to said vessel closure, a directional indicator on an upper surface of said discoid member showing the discharging direction of said spray nozzle, and a depending cylindrical skirt extending axially from said discoid member to the position of said circumferential surface of said pedestal;

a set of at least three circumferentially spaced axial detent grooves on said circumferential surface of said pedestal;

a corresponding set of circumferentially-spaced vanes on a facing surface of said depending skirt, said vanes being resiliently flexible so as to normally engage said detents to define and maintain a corresponding at least three stable rotational positions of said spray head relative to said vessel closure, but deflectable out of engagement therewith to permit manual rotation of said spray head between said rotational positions;

a helical ramp affixed on said pedestal extending circumferentially at least part way around said stem and having an upper cam surface sloping generally continuously from said pedestal to a raised flat surface thereon; said lower surface of said spray head engaging said flat surface at a first said rotational position of said head to prevent depression of said spray head, engaging said sloping cam surface at a second said rotational position to provide limited-stroke operation of said spray head, and not engaging said helical ramp at a third said rotational position to provide full-stroke operation of said spray head; and a corresponding at least three indicia on said vessel closure for identifying the rotational positions of said spray head relative to said closure and each of which is substantially aligned with said directional indicator at the respective said rotational position.

11. A liquid dispensing pump arrangement for dispensing predetermined quantities of a dispensible liquid contained in a vessel, comprising reciprocating pump means having dip tube means extending into said liquid in said vessel and a depressible hollow pump stem through which the liquid is delivered;

a vessel closure fastened onto a cooperating port of the vessel and supporting the reciprocating pump means with said dip tube means immersed into said liquid and including a cylindrical member rising over a lower portion of said stem and having a generally cylindrical axial surface;

a finger-depressible push-button dispensing head disposed atop said stem and including socket means surrounding a top portion of said stem, an outlet nozzle extending radially from said socket means, and depending skirt means extending down to overlap at least a portion of said cylindrical member and being axially movable relative thereto;

a helical ramp fixed on said closure within said depending skirt means extending at least part way around said stem and having a sloping cam surface engagable with a portion of said dispensing head to limit downward stroke distance thereof a plurality of different selected amounts at a respective plurality of rotational positions relative to said vessel closure;

a set of one or more circumferentially-spaced fins and a corresponding set of circumferentially-spaced detents, one of which sets is disposed on the circumferential surface of said cylindrical member and the other of which is disposed on a facing surface of said depending skirt means, said fins being resiliently flexible so that the same normally engage said detents to maintain an established said rotational position, but can be deflected out of engagement with said detents by manual rotation of said dispensing head between said rotational positions.

12. A liquid dispensing pump arrangement for dispensing predetermined quantities of a dispensible liquid contained in a vessel, comprising reciprocating pump means having a dip tube extending into said liquid in said vessel and a depressible pump stem through which the liquid is delivered;

a vessel closure fastenable onto a cooperating port of the vessel and supporting the reciprocating pump means with said dip tube immersed into said liquid and including a pedestal surrounding a lower portion of said stem and having a generally cylindrical outer surface;

a finger-depressible push-button dispensing head disposed atop said stem and including socket means surrounding a top portion of said stem, an outlet nozzle extending radially from said socket means, depending skirt means extending over at least a portion of the cylindrical surface of said pedestal, and a depending tab affixed onto said nozzle;

a helical ramp on said pedestal extending circumferentially at least part way around said stem and having a sloping cam surface engageable with said depending tab to limit the stroke distance of said head a plurality of different amounts at a respective plurality of rotational positions of said head relative to said vessel closure, and having a boss at an end of said sloping cam surface remote from said pedestal to engage said tab and prevent rotation of said head beyond a lock position corresponding to such engagement; and cooperating detent means arranged on said circumferential surface of said pedestal and on a facing surface of said depending skirt means for establishing said rotational positions of said dispensing head relative to said vessel closure, normally holding said head at one such rotational position but resiliently yielding under manual force to permit turning of said head to at least another said rotational position relative to said vessel closure.

13. A liquid dispensing pump arrangement according to claim 12, wherein said depending tab is disposed on a side of said outlet nozzle downramp of the nozzle.

14. A liquid dispensing pump arrangement according to claim 13, wherein a flat portion is provided on said ramp adjacent said boss, with the latter engaging a lower surface of said nozzle and said flat portion engaging said tab for preventing any downward stroke movement of said head in said lock position.

15. A liquid dispensing pump arrangement for dispensing predetermined quantities of a dispensible liquid contained in a vessel, comprising reciprocating pump means having a dip tube extending into said liquid in the vessel and a depressible pump stem through which the liquid is delivered;

a vessel closure fastenable onto a cooperating port of the vessel and supporting the reciprocating pump means with said dip tube immersed into said liquid and including a pedestal surrounding a lower portion of said stem and having a generally cylindrical outer surface;

a finger-depressible push-button dispensing head disposed atop said stem and including socket means surrounding a top portion of said stem, an outlet nozzle extending radially from said socket means, depending skirt means extending over at least a portion of the cylindrical surface of said pedestal, and a depending tab affixed onto said nozzle;

a helical ramp on said pedestal extending circumferentially at least part way around said stem and having a sloping cam surface engageable with said depending tab to limit the stroke distance of said head a plurality of different amounts at a respective plurality of rotational positions of said head relative to said vessel closure, and having boss means disposed at an end of said sloping cam surface for engaging said tab and preventing rotation of said head beyond a lock position corresponding to such engagement; and cooperating detent means arranged on said circumferential surface of said pedestal and on a facing surface of said depending skirt means for establishing said rotational positions of said dispensing head relative to said vessel closure, including a plurality of axial cutouts arranged over at least a portion of said cylindrical surface, and at least one axially extending fin on said depending skirt means engaging a corresponding at least one of said axial cutouts to establish said rotational positions, at least when said head is depressed.

* * * * *